United States Patent
Dabney

(10) Patent No.: US 10,393,564 B1
(45) Date of Patent: Aug. 27, 2019

(54) EXTENDABLE MEASURING CUP

(71) Applicant: Jermaine Dabney, Henrico, VA (US)

(72) Inventor: Jermaine Dabney, Henrico, VA (US)

( * ) Notice: Subject to any disclaimer, the term of this patent is extended or adjusted under 35 U.S.C. 154(b) by 256 days.

(21) Appl. No.: 15/484,222

(22) Filed: Apr. 11, 2017

(51) Int. Cl.
*G01F 19/00* (2006.01)

(52) U.S. Cl.
CPC .................. *G01F 19/00* (2013.01)

(58) Field of Classification Search
CPC ...... G01D 11/245; G01D 11/24; G01F 19/00; A47J 43/0711; A47J 43/10; A47J 25/00; A47J 27/00; B01F 7/18; B01F 7/16; G01N 15/0272; B65D 83/00
See application file for complete search history.

(56) References Cited

U.S. PATENT DOCUMENTS

| | | | |
|---|---|---|---|
| 3,149,824 A | 9/1964 | Albano | |
| 3,810,605 A | 5/1974 | Lambert | |
| 4,184,779 A | 1/1980 | Detmer | |
| 4,832,501 A | 5/1989 | McCauley | |
| 5,666,874 A | 9/1997 | Wang | |
| D399,091 S | 10/1998 | Rubin | |
| 5,816,136 A | 10/1998 | Stallings | |
| 6,619,833 B1 | 9/2003 | Skudelny | |
| 6,666,329 B1 * | 12/2003 | Charbonneau | A45F 3/20 206/218 |
| 9,138,103 B1 | 9/2015 | Cados | |
| 9,506,851 B2 * | 11/2016 | Libasci | G01F 19/00 |
| 2006/0151520 A1 * | 7/2006 | Chang | A47F 1/085 221/65 |

FOREIGN PATENT DOCUMENTS

WO    03086600 A1   10/2003

* cited by examiner

*Primary Examiner* — Harshad R Patel
*Assistant Examiner* — Nigel H Plumb

(57) ABSTRACT

The extendable measuring cup is constructed of a plurality of measuring cups that are successively arranged in size. The plurality of measuring cups vary in size from one another such that all of the measuring cups are able to nest within one another. The plurality of measuring cups is further defined with a topmost cup that includes internal threading. The topmost cup is able to connect with a threaded container via the internal threading. The topmost cup includes a disc member that is able to pivot with respect to a slot provided on the topmost cup. The disc member is able to rotate from outside of the topmost cup to inside of the topmost cup. In use, the disc member is able to enclose an interior formed with the plurality of measuring cups.

15 Claims, 5 Drawing Sheets

EXTENDABLE MEASURING CUP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of measuring cups and measuring devices, more specifically, a cup that is extendable in order to measure different amounts of materials.

SUMMARY OF INVENTION

The extendable measuring cup is constructed of a plurality of measuring cups that are successively arranged in size. The plurality of measuring cups vary in size from one another such that all of the measuring cups are able to nest within one another. The plurality of measuring cups is further defined with a topmost cup that includes internal threading. The topmost cup is able to connect with a threaded container via the internal threading. The topmost cup includes a disc member that is able to pivot with respect to a slot provided on the topmost cup. The disc member is able to rotate from outside of the topmost cup to inside of the topmost cup. In use, the disc member is able to enclose an interior formed with the plurality of measuring cups. The plurality of measuring cups is further defined with a bottommost cup that is smallest in size compared to all of the plurality of measuring cups. The bottommost cup includes a bottom surface, which is unique from all of the plurality of measuring cups. With the exception of the bottommost cup, all of the measuring cups lack a bottom surface, and thereby resemble a ring-shaped object. The plurality of measuring cups is able to extend and retract collectively. Each one of the plurality of measuring cups is able to rotate to lock or unlock itself with respect to an adjacent one of the plurality of measuring cups. The ability to lock or unlock each one of the plurality of measuring cups enables an end user to select a fluid amount to be measured via the plurality of measuring cups.

It is an object of the invention to provide a measuring cup that is composed of a plurality of measuring cups that are arranged in size such that the plurality of measuring cups is able to be extended or retracted in order to form a specific fluidic amount that is to be measured.

A further object of the invention is for the bottommost cup to have a bottom surface onto which an item is able to rest when inserted into the plurality of measuring cups.

A further object of the invention is for the topmost cup to include internal threading that enables a threaded container to be attached to the invention.

A further object of the invention is for a disk member to be included with the topmost cup, and which is able to pivot out or into the topmost cup in order to seal off an interior of the plurality of measuring cups. The ability of the disk member to seal off the interior, enables contents dispensed into the plurality of measuring cups to be sealed inside of the invention, and dispensed therefrom at the discretion of the end user.

These together with additional objects, features and advantages of the extendable measuring cup will be readily apparent to those of ordinary skill in the art upon reading the following detailed description of the presently preferred, but nonetheless illustrative, embodiments when taken in conjunction with the accompanying drawings.

In this respect, before explaining the current embodiments of the extendable measuring cup in detail, it is to be understood that the extendable measuring cup is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the extendable measuring cup.

It is therefore important that the claims be regarded as including such equivalent construction insofar as they do not depart from the spirit and scope of the extendable measuring cup. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
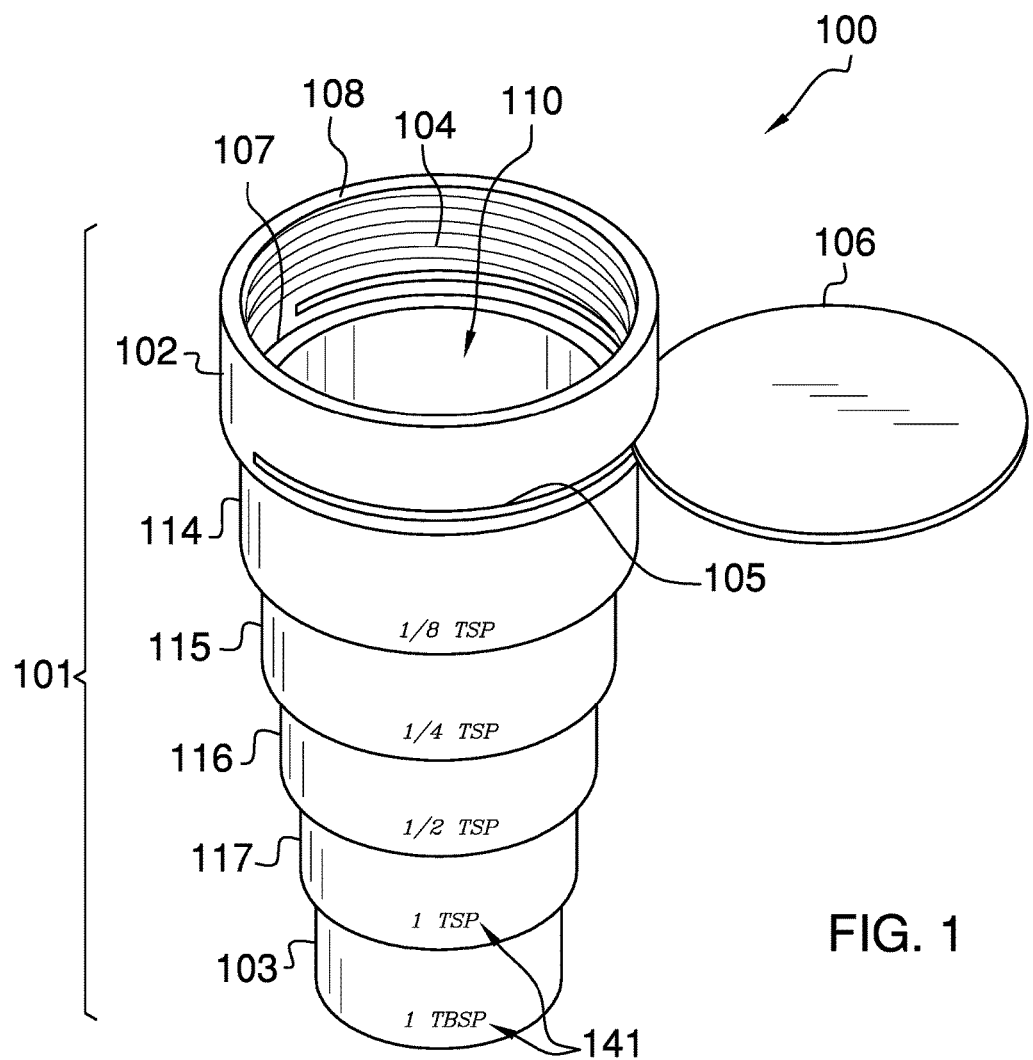
FIG. 1 is a perspective view of an embodiment of the disclosure.
Figure 2:
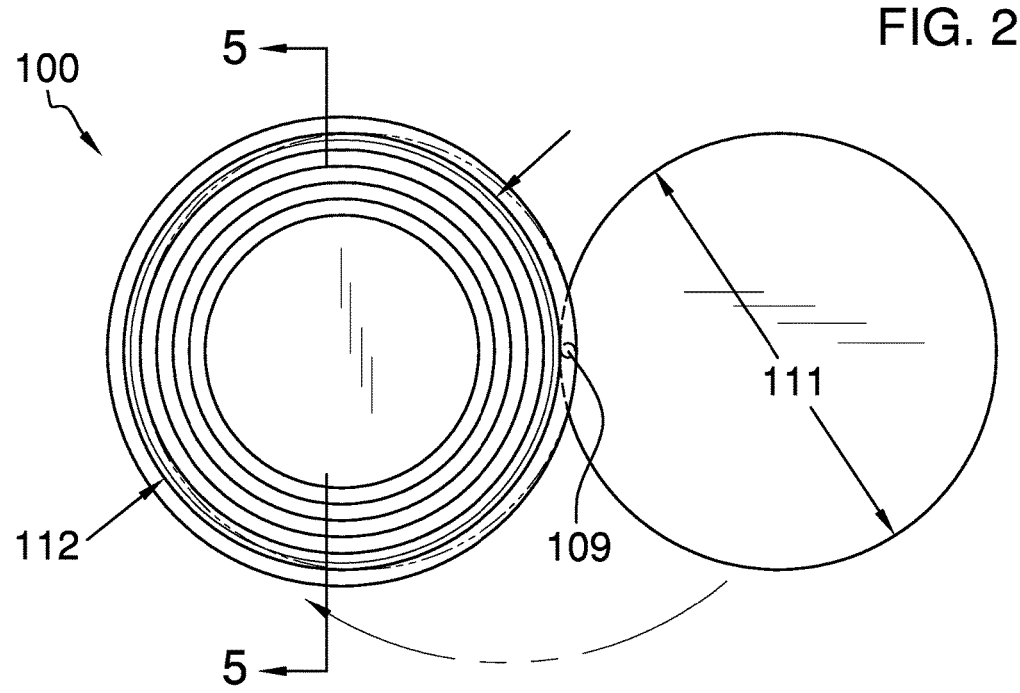
FIG. 2 is a top view of an embodiment of the disclosure.
Figure 3:
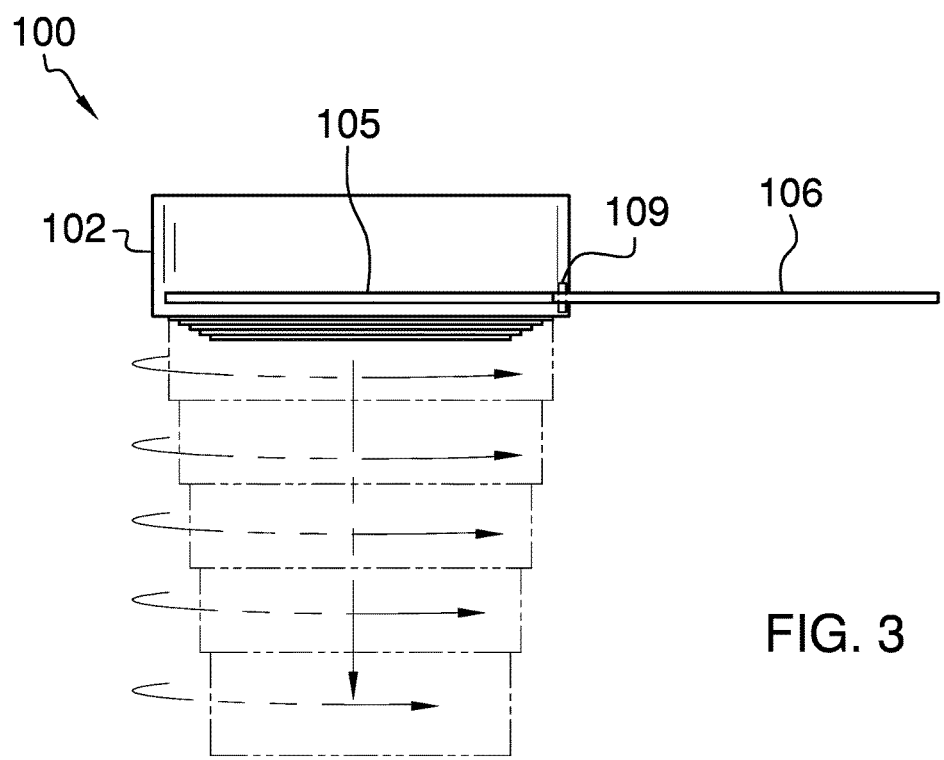
FIG. 3 is a side view of an embodiment of the disclosure.
Figure 4:
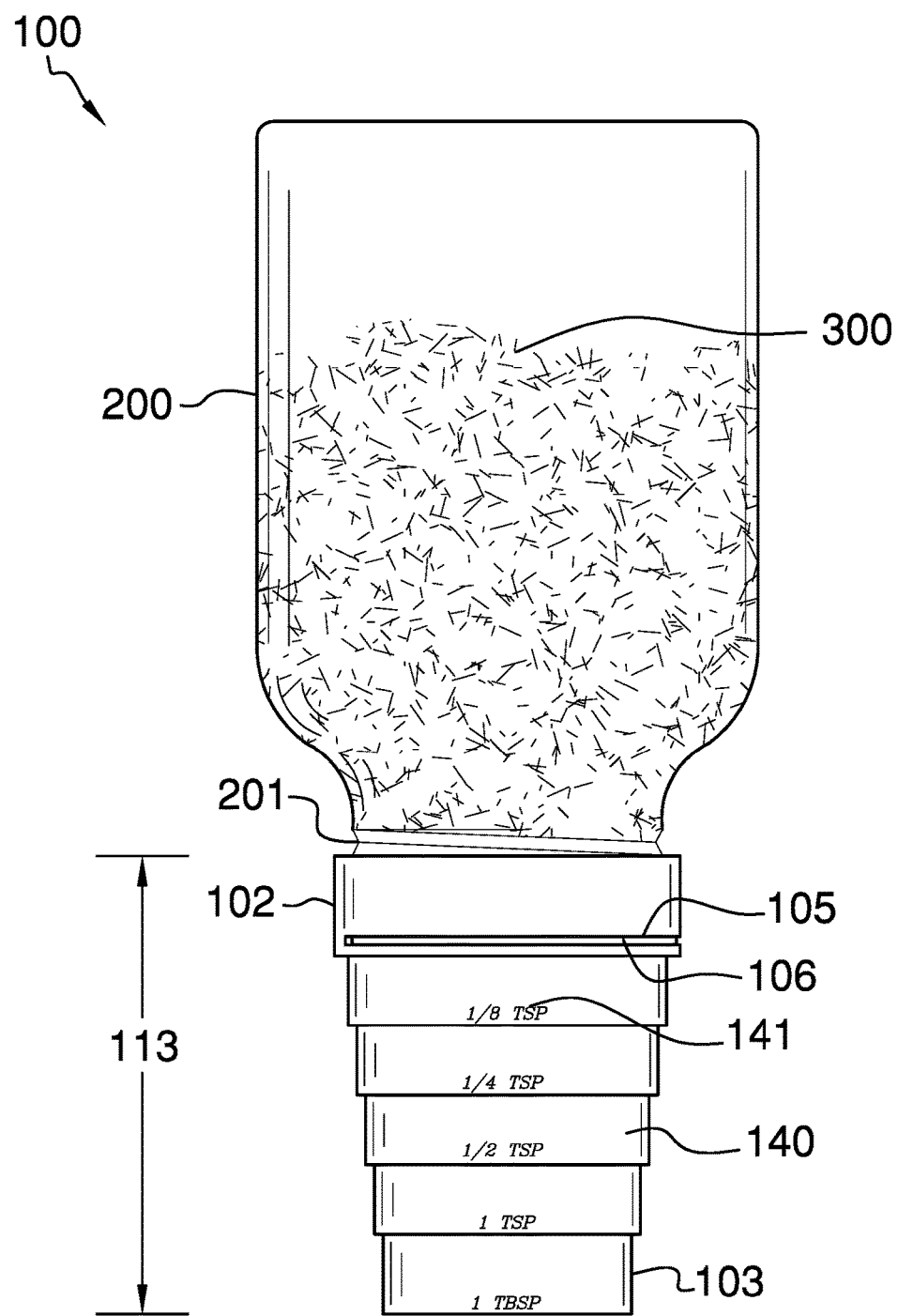
FIG. 4 is a side view of an embodiment of the disclosure in use.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The extendable measuring cup 100 (hereinafter invention) comprises a plurality of measuring cups 101. The plurality of measuring cups 101 is further defined with a topmost cup 102, and a bottommost cup 103. Each of the plurality of measuring cups 101 has a different size such that the plurality of measuring cups 101 nest with respect to one another. The topmost cup 102 is largest of all of the plurality of measuring cups 101. The bottommost cup 103 is smallest of all of the plurality of measuring cups 101.

The topmost cup 102 is further defined with internal threading 104, a slot 105, and a disc member 106. The internal threading 104 is provided on an inner surface 107 of the topmost cup 102. Moreover, the internal threading 104 begins at a top edge 108 of the topmost cup 102. The internal threading 104 extends downwardly from the top edge 108 of the topmost cup 102. The internal threading 104 enables the topmost cup 102 to be screwed onto a threaded container 200. The threaded container 200 must have external threading 201 that corresponds with the internal threading 104 of the topmost cup 102. Moreover, the internal threading 104 enables the invention 100 to be secured to the threaded container 200 in order for a material 300 to be introduced into the plurality of measuring cups 101 for measuring purposes.

The slot 105 facilitates the opening and closing off of the plurality of measuring cups 101 via the disc member 106. Moreover, the disc member 106 rotates with respect to a pivot point 109. The pivot point 109 interfaces with the slot 105. The disc member 106 is able to rotate from within the topmost cup 102 to outside of the topmost cup 102. The rotational motion of the disc member 106 enables an interior 110 of the plurality of measuring cups 101 to be temporarily sealed off.

The slot 105 extends horizontally across a portion of the topmost cup 102. The slot 105 does not fully encircle the topmost cup 102. The disc member 106 has an outer disc diameter 111, which is greater than a top inner diameter 112 of the topmost cup 102. The outer disc diameter 111 is greater than the top inner diameter 112 in order to ensure that the disc member 106 is able to seal off the interior 110 of the plurality of measuring cups 101.

The bottommost cup 103 is distal with respect to the topmost cup 102. An overall span 113 of the plurality of measuring cups 101 is limited via the bottommost cup 103 and the topmost cup 102. The overall span 113 varies depending on how or which of the plurality of measuring cups 101 is being used. Referring to FIG. 1, the plurality of measuring cups 101 includes a first measuring member 114, a second measuring member 115, a third measuring member 116, and a fourth measuring member 117. The first measuring member 114 is adjacent the topmost cup 102; whereas the fourth measuring member 117 is adjacent the bottommost cup 103.

The second measuring member 115 is adjacent the first measuring member 114 and the third measuring member 116. The third measuring member 115 is adjacent the second measuring member 115 and the fourth measuring member 117. The topmost cup 102, the first measuring member 114, the second measuring member 115, the third measuring member 116, and the fourth measuring member 117 are all ring-shaped components that do not include a bottom. The bottommost cup 103 includes a bottom surface 118.

The top inner diameter 112 of the topmost cup 102 is larger than a first outer diameter 119 of the first measuring member 114. A second outer diameter 120 of the second measuring member 115 is less than a first inner diameter 121 of the first measuring member 114. A third outer diameter 122 of the third measuring member 116 is less than a second inner diameter 123 of the second measuring member 115. A fourth outer diameter 124 of the fourth measuring member 117 is less than a third inner diameter 125 of the third measuring member 116. A bottommost outer diameter 126 of the bottommost cup 103 is less than a fourth inner diameter 127 of the fourth measuring member 117.

Figure 5:
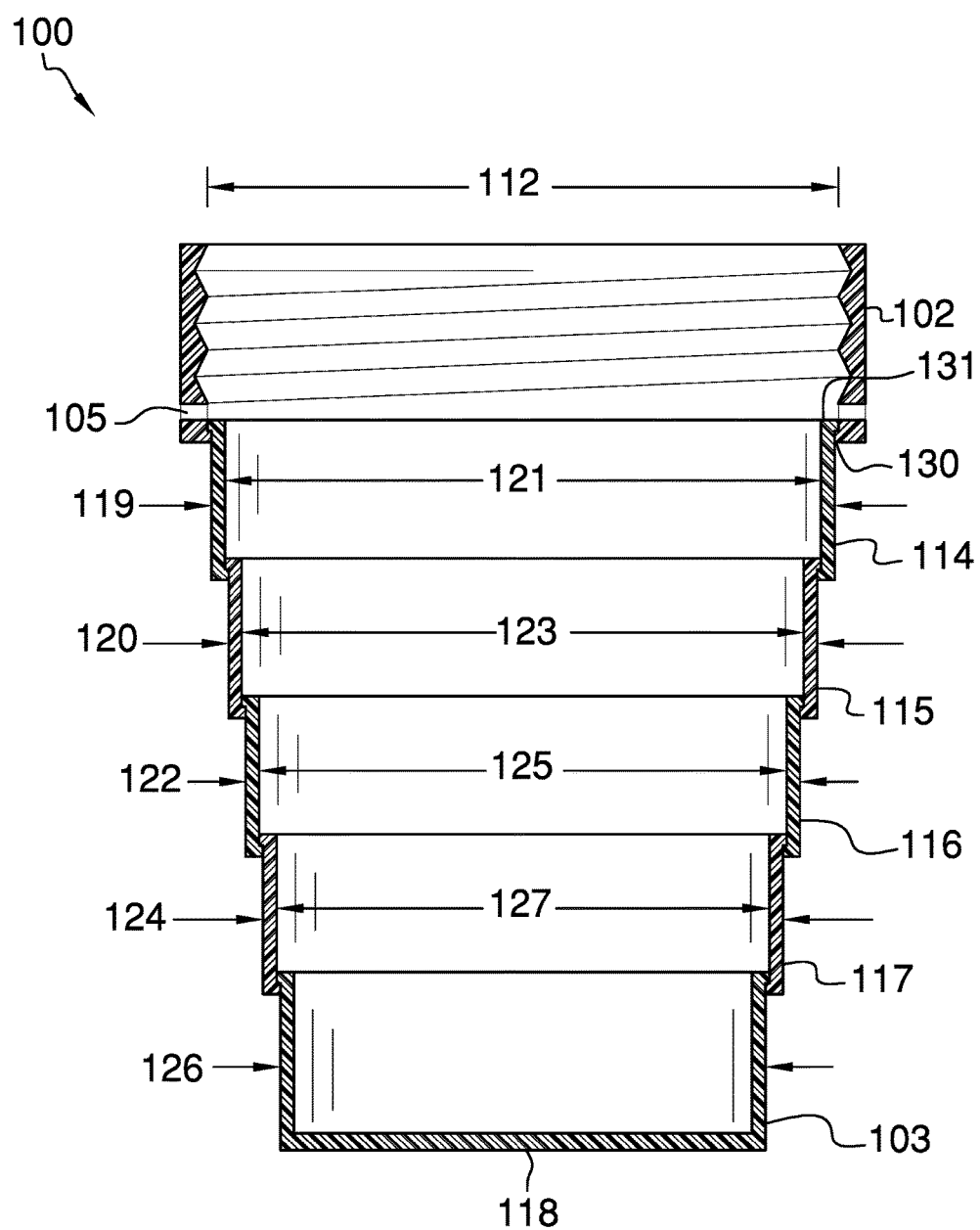
FIG. 5 is a cross-sectional view of an embodiment of the disclosure along line 5-5 in FIG. 2.

Referring to FIG. 5, the topmost cup 102, the first measuring member 114, the second measuring member 115, the third measuring member 116, and the fourth measuring member 117 all have a bottom lip 130. The bottom cup 103, the first measuring member 114, the second measuring member 115, the third measuring member 116, and the fourth measuring member 117 all have a top lip 131. The bottom lip 130 and the top lip 131 prevent separation of the respective components.

Figure 6:
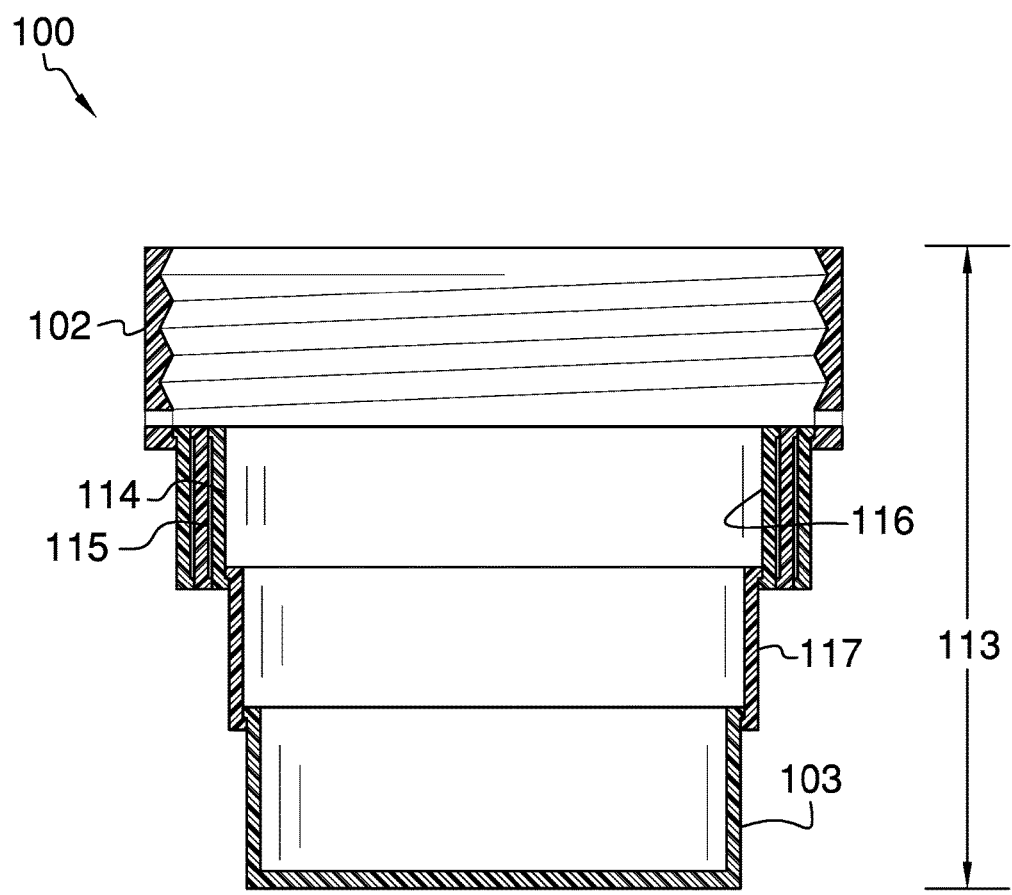
FIG. 6 is another cross-sectional view of an embodiment of the disclosure along line 5-5 in FIG. 2.

All of the plurality of measuring cups 101 is able to fully nest when not in use. The span 113 of the plurality of measuring cups 101 is adjusted upon rotation of a selected one of the plurality of measuring cups 101, and dropping of the selected one of the plurality of measuring cups 101 (see FIG. 3). Referring to FIG. 6, the bottommost cup 103, the fourth measuring member 117, and the third measuring member 116 are extended, while the second measuring member 115 and the first measuring member 114 are nested with respect to the third measuring member 116.

The plurality of measuring cups 101 is further defined with an exterior surface 140. A measurement indicia 141 is optionally imprinted on the exterior surface 140 of each of the plurality of measuring cups 101 in order to denote a fluid amount for purposes of measuring the material 300 via the invention 100.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An extendable measuring cup comprising:
 a plurality of measuring cups that are in a nested arrangement such that the plurality of measuring cups extend and retract to adjust an overall span in order to adjust a volume of the plurality of measuring cups;
 wherein the overall span of the plurality of measuring cups is adjustable in order to adaptively measure a material;
 wherein the plurality of measuring cups is further defined with a topmost cup, and a bottommost cup;

wherein each of the plurality of measuring cups has a different size such that the plurality of measuring cups nest with respect to one another;

wherein the topmost cup is largest of all of the plurality of measuring cups;

wherein the bottommost cup is smallest of all of the plurality of measuring cups;

wherein the topmost cup is further defined with internal threading, a slot, and a disc member.

2. The extendable measuring cup according to claim 1 wherein the internal threading is provided on an inner surface of the topmost cup; wherein the internal threading begins at a top edge of the topmost cup; wherein the internal threading extends downwardly from the top edge of the topmost cup.

3. The extendable measuring cup according to claim 2 wherein the internal threading enables the topmost cup to be screwed onto a threaded container; wherein the threaded container has external threading that corresponds with the internal threading of the topmost cup; wherein the internal threading enables the extendable measuring cup to be secured to the threaded container in order for said material to be introduced into the plurality of measuring cups for measuring purposes.

4. The extendable measuring cup according to claim 3 wherein the slot facilitates the opening and closing off of the plurality of measuring cups via the disc member; wherein the disc member rotates with respect to a pivot point; wherein the pivot point interfaces with the slot; wherein the disc member is able to rotate from within the topmost cup to outside of the topmost cup; wherein the rotational motion of the disc member enables an interior of the plurality of measuring cups to be temporarily sealed off.

5. The extendable measuring cup according to claim 4 wherein the slot extends horizontally across a portion of the topmost cup; wherein the slot does not fully encircle the topmost cup; wherein the disc member has an outer disc diameter, which is greater than a top inner diameter of the topmost cup.

6. The extendable measuring cup according to claim 5 wherein the outer disc diameter is greater than the top inner diameter in order to ensure that the disc member is able to seal off the interior of the plurality of measuring cups.

7. The extendable measuring cup according to claim 6 wherein the bottommost cup is distal with respect to the topmost cup; wherein the overall span of the plurality of measuring cups is limited via the bottommost cup and the topmost cup.

8. The extendable measuring cup according to claim 7 wherein the plurality of measuring cups includes a first measuring member, a second measuring member, a third measuring member, and a fourth measuring member.

9. The extendable measuring cup according to claim 8 wherein the first measuring member is adjacent the topmost cup; wherein the fourth measuring member is adjacent the bottommost cup.

10. The extendable measuring cup according to claim 9 wherein the second measuring member is adjacent the first measuring member and the third measuring member; wherein the third measuring member is adjacent the second measuring member and the fourth measuring member.

11. The extendable measuring cup according to claim 10 wherein the topmost cup, the first measuring member, the second measuring member, the third measuring member, and the fourth measuring member are all ring-shaped components that do not include a bottom; wherein the bottommost cup includes a bottom surface.

12. The extendable measuring cup according to claim 11 wherein the top inner diameter of the topmost cup is larger than a first outer diameter of the first measuring member; wherein a second outer diameter of the second measuring member is less than a first inner diameter of the first measuring member; wherein a third outer diameter of the third measuring member is less than a second inner diameter of the second measuring member; wherein a fourth outer diameter of the fourth measuring member is less than a third inner diameter of the third measuring member; wherein a bottommost outer diameter of the bottommost cup is less than a fourth inner diameter of the fourth measuring member.

13. The extendable measuring cup according to claim 12 wherein the topmost cup, the first measuring member, the second measuring member, the third measuring member, and the fourth measuring member all have a bottom lip; wherein the bottom cup, the first measuring member, the second measuring member, the third measuring member, and the fourth measuring member all have a top lip; wherein the bottom lip and the top lip prevent separation of the respective components.

14. The extendable measuring cup according to claim 13 wherein all of the plurality of measuring cups is able to fully nest when not in use; wherein the overall span of the plurality of measuring cups is adjusted upon rotation of a selected one of the plurality of measuring cups, and dropping of the selected one of the plurality of measuring cups.

15. The extendable measuring cup according to claim 14 wherein the plurality of measuring cups is further defined with an exterior surface; wherein a measurement indicia is imprinted on the exterior surface of each of the plurality of measuring cups in order to denote a fluid amount for purposes of measuring the material contained within the interior of the plurality of measuring cups.

* * * * *